May 9, 1967  W. K. VERNOR  3,318,464
APPARATUS FOR SUSPENDING A DIFFERENTIAL GEAR
ASSEMBLY DURING INSTALLATION ON AN AXLE
Filed Jan. 17, 1966
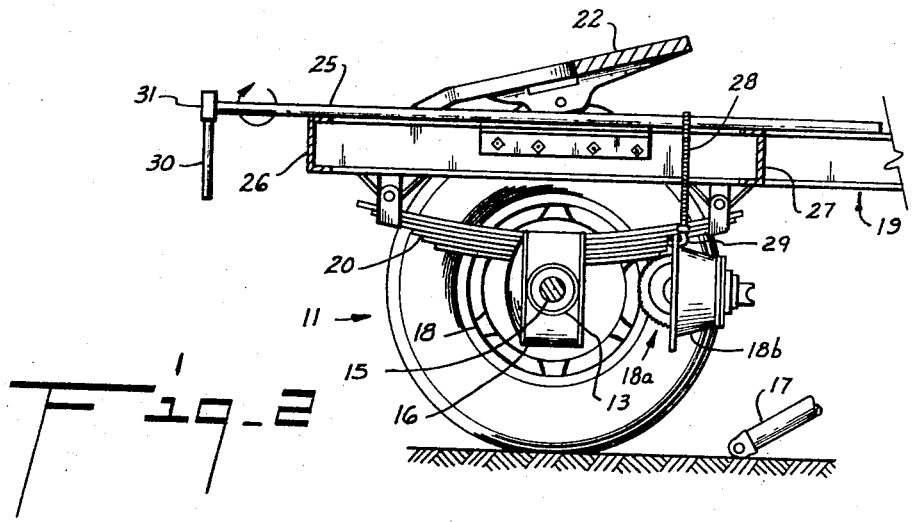
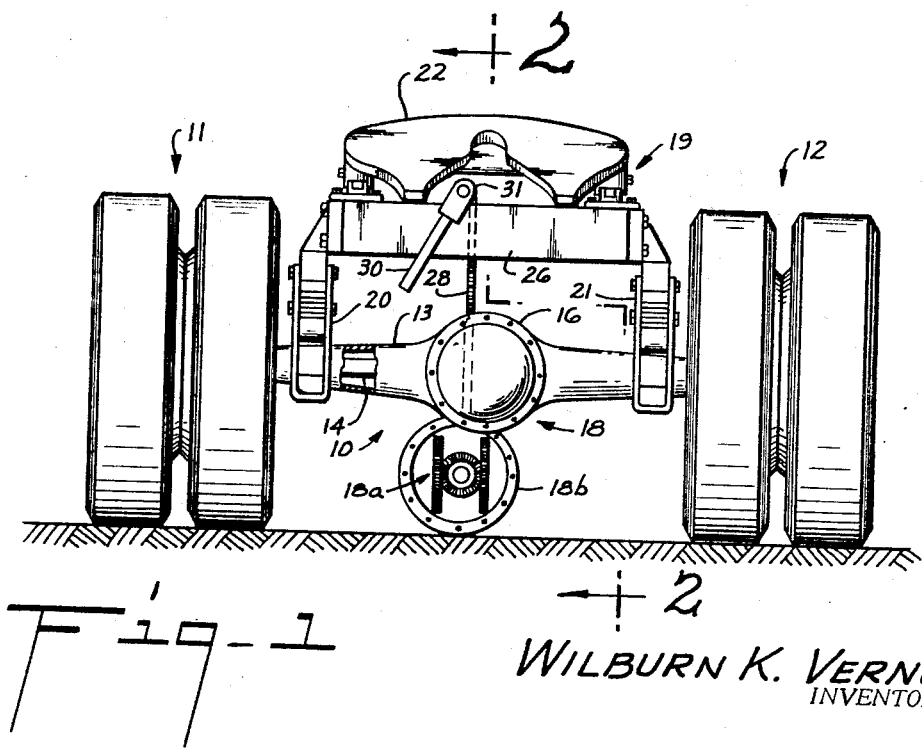
WILBURN K. VERNOR
INVENTOR.
BY
ATTORNEYS

United States Patent Office 3,318,464
Patented May 9, 1967

3,318,464
APPARATUS FOR SUSPENDING A DIFFERENTIAL GEAR ASSEMBLY DURING INSTALLATION ON AN AXLE
Wilburn K. Vernor, 805 Pin Money Drive, Clute, Tex. 77531
Filed Jan. 17, 1966, Ser. No. 521,014
2 Claims. (Cl. 212—134)

This invention relates to apparatus for suspending a differential gear assembly in position to be mounted on an axle, and more particularly, to such apparatus for suspending the differential gear assembly or third member of a truck in position to be mounted on the axle of the truck, where the truck has a fifth wheel located over the axle upon which the differential gear assembly is to be mounted.

When repairing a truck differential gear assembly it is usually necessary to remove the housing that is attached to the front of the differential casing on the axle housing. This portion of the differential gear assembly, i.e., the housing and the differential gears therein, is called the "third member."

After a differential is repaired, the third member must be again mounted on the differential casing on the axle. These third members usually are too heavy to be moved manually into position to be bolted to the axle. Therefore, some mechanical means must be used to raise the third member up and hold it in position to be connected to the axle. Where the truck is provided with a fifth wheel, it normally is located over the axle, which carries the third member in such a position that it makes it difficult, if not impossible, to suspend the third member by a hoist located above the truck. Therefore, in the past it has been the practice to use floor jacks of various types to raise the third member into position to be reinstalled on the axle. This is a dangerous and difficult operation. The shape of the third member makes it hard to hold on the jack which makes its installation a dangerous operation.

It is an object of this invention to provide apparatus for suspending a third member in position to be mounted on the axle of a truck, even though the truck has a fifth wheel located above the axle.

It is another object of this invention to provide apparatus that can be located above the axle of a truck and below its fifth wheel, while being supported by the truck, to suspend a third member from the truck in position to be mounted on the axle directly beneath the fifth wheel.

It is yet another object of this invention to provide apparatus that can be supported by a truck and located under the fifth wheel thereof, which will raise the third member and hold it in suspension in alignment with the differential casing on the axle to which it is to be attached, and which can be moved axially to move the third member into position to be so attached.

These and other objects, advantages and features of this invention will be apparent to those skilled in the art from a consideration of this specification and attached drawings.

A preferred embodiment of the invention will now be described in detail in connection with the attached drawings in which:

FIG. 1 is a rear view of a conventional truck having a fifth wheel mounted over its rear axle upon which the truck differential gear assembly is mounted; and FIG. 2 is a side view taken along line 2—2 of FIG. 1 showing the apparatus of this invention suspending a third member in position for movement horizontally into position to be mounted on the differential casing of the axle.

For the sake of simplicity, only the rear portion of the truck is shown in the drawings. It includes a rear axle assembly 10, which extends between dual wheels 11 and 12. The axle assembly includes an axle housing 13, which encloses axle shafts 14 and 15. The shafts are connected to and drive dual wheel assemblies 11 and 12. The axle housing also includes differential casing 16, which forms a part of the housing for differential and drive gear assembly 18 that transmits power from drive shaft 17 to axle shafts 14 and 15. The differential and drive gear assembly includes subassembly 18a, which is removably mounted on the differential casing 16 of the axle housing, and is called the third member. The third member includes various gears, usually most if not all of the differential gears, which are mounted in housing 18b.

The axle housing also supports bed 19 of the truck through leaf springs 20 and 21. Mounted on the truck bed in the conventional manner is fifth wheel 22, through which the truck is connected to the trailer it pulls. As shown in the drawings, the fifth wheel is mounted on the bed of the truck directly over the rear axle assembly. This usually is the case so that the weight supported by the fifth wheel will be in vertical alignment with the rear axle, when the truck is level. This keeps the turning torque imposed on the truck by the trailer to a minimum.

As stated above, with this arrangement, it is very difficult to provide any means for suspending the third member, while it is being assembled to differential casing 16 of the axle housing. Therefore, in accordance with this invention, elongated shaft 25 is positioned to extend between the supports of fifth wheel 22 and rest on the bed of the truck, in the manner shown in the drawings. The truck bed illustrated is of the open frame type having cross members 26 and 27 which can support shaft 25 in this position. If such cross members are not conveniently located on the bed of the truck being repaired by the replacement of its third member, then temporary cross members can be laid on the truck bed to provide the necessary support for the shaft. These cross members, of course, cannot be so thick as to raise the shaft up to the extent that it will not pass below the fifth wheel.

To suspend the third member from the shaft, flexible line 28, which in the embodiment shown, is a roller link chain, has one end connected to the shaft and the other end arranged to be connected to the third member. In the embodiment shown, the end of the flexible line to be connected to the third member is provided with hook 29, which can be conventionally inserted in the top bolt hole of third member housing 18b. The apparatus operates as follows: As shown in FIG. 1, third member 18a is resting on the ground and flexible line 28 has been connected thereto. To raise the third member into horizontal alignment with differential casing 16 of the axle housing, shaft 25 is rotated. This causes flexible line 28 to wrap itself around the shaft and raise the third member off the ground.

In the embodiment shown, wrench 30 is connected to the end of shaft 25 to assist in rotating the shaft to raise the third member. The wrench includes a ratchet head 31, which allows the shaft to be rotated more conveniently than if a conventional wrench was employed. Shaft 25 can be arranged so that a regular socket type ratchet wrench can be employed or the wrench can be integrally connected to the shaft to form a permanent part thereof.

As shaft 25 is rotated by wrench 30, flexible line 28 wraps itself upon the shaft and raises the member 18 into horizontal alignment with housing 16 as shown in FIG. 2. In this position, the shaft 25 can be slid axially on its supports on the bed of a truck and the third member will be moved horizontally into position to be bolted to differential casing 16 of the axial housing.

As shaft 25 is rotated to wrap the flexible line thereon it would, of course, tend to move laterally on the truck bed. The fifth wheel will limit the distance the shaft can move laterally and after the third member is raised high enough it can easily be slid back into alignment with the casing.

The apparatus of this invention also can be employed to lower a third member to the ground, when removing a third member for repair or replacement, by reversing the above-described procedure.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. Apparatus for suspending a third member for mounting on the axle of a truck where the truck has a fifth wheel mounted on its bed directly above the position where the third member is to be connected to the axle, comprising, an elongated shaft axially movable horizontally parallel to the longitudinal axis of the truck under the fifth wheel and above the bed to be slidably and rotatably supported by the bed and a flexible line having one end attached to the shaft and one end adapted to be attached to the third member to wrap around the shaft as it is rotated and lift the third member sufficiently to be moved into position to be mounted on the axle by sliding the shaft axially on the bed under the fifth wheel.

2. Apparatus for suspending a truck third member for mounting on an axle of a truck at a position located directly below the location of the truck's fifth wheel on the truck bed comprising, an elongated shaft of circular cross section for sliding axially along the bed parallel to the longitudinal axis of the truck and under the fifth wheel to the desired position over the axle, a flexible line having one end connected to the shaft and its other end, hanging downwardly below the bed in position to be connected to a third member, means for connecting the downwardly hanging end of the line to a third member, and means for rotating the shaft to wrap the line thereon and raise such third member into horizontal alignment with the axle of the truck so such third member can be moved horizontally into position to be mounted on the axle by sliding the shaft longitudinally on the truck bed.

References Cited by the Examiner

UNITED STATES PATENTS

| | | | |
|---|---|---|---|
| 1,952,238 | 3/1934 | Dice | 212—13 |
| 2,072,398 | 3/1937 | Faulk | 254—145 |
| 2,730,244 | 1/1956 | Berggren | 254—145 |

EVON C. BLUNK, *Primary Examiner.*

H. C. HORNSBY, *Assistant Examiner.*